Feb. 27, 1923.
F. D. BROUN ET AL.
PACKAGED FOOD PRODUCT.
ORIGINAL FILED APR. 21, 1921.
1,446,782.
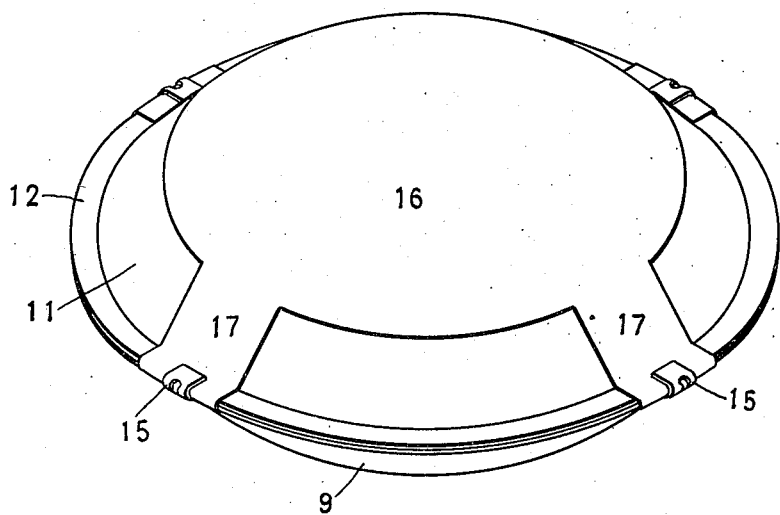
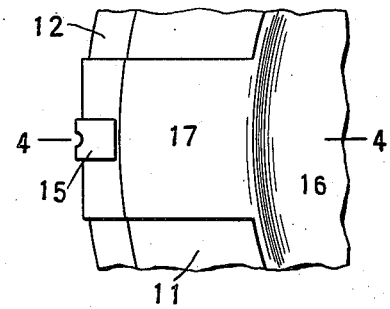
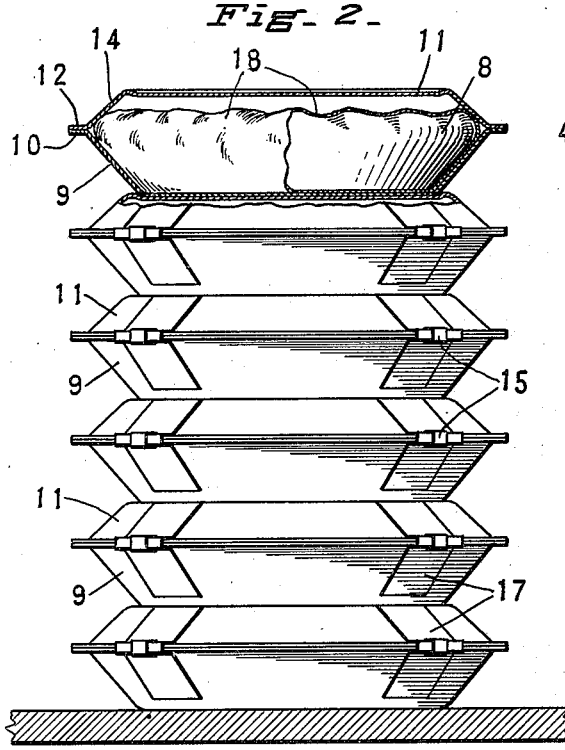
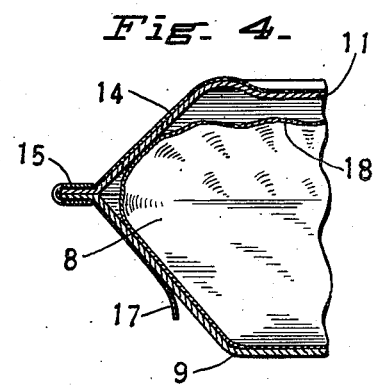

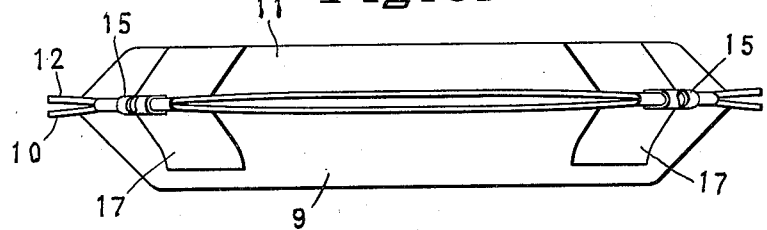
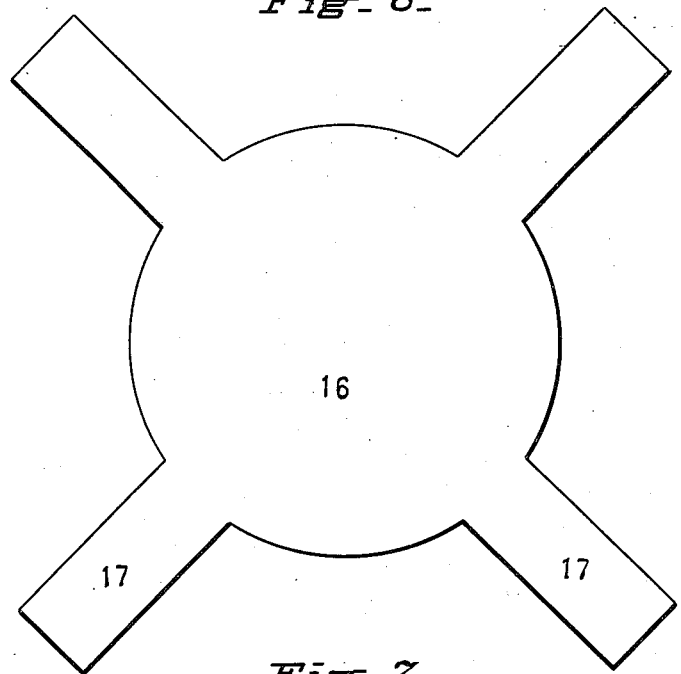
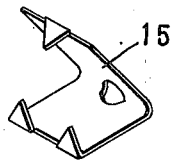

Patented Feb. 27, 1923.

1,446,782

UNITED STATES PATENT OFFICE.

FLEMING DUVAL BROUN, OF NEW YORK, AND WILLIAM RUSSELL McALEVEY, OF BROOKLYN, NEW YORK, ASSIGNORS, BY MESNE ASSIGNMENTS, TO "THE ONLY PACKAGE PIE," INCORPORATED, OF NEW YORK, N. Y., A CORPORATION OF DELAWARE.

PACKAGED FOOD PRODUCT.

Continuation of application Serial No. 463,377, filed April 21, 1921. This application filed March 18, 1922. Serial No. 544,821.

*To all whom it may concern:*

Be it known that we, FLEMING DUVAL BROUN and WILLIAM RUSSELL McALEVEY, citizens of the United States, residing at New York and Brooklyn, respectively, in the counties of Kings and New York and State of New York, have invented certain new and useful Improvements in Packaged Food Products, of which the following is a specification.

This invention in one of its aspects, relates to a new article of manufacture, to wit, a pie or similar unit of food-stuff, effectively sealed in a cheap container that protects the food-stuff against the usual possibilities of deterioration and contamination, and which, because of the mechanical construction of the container and its definite cooperative relation to the contained food-stuff unit, is non-collapsing and self-sustaining to the extent that it will withstand ordinary handling in transportation, and so that a considerable number of the articles may be stacked, one on the other.

A further object is to provide a container proper which is substantially self-revealing as to the nature and condition of its contained unit, which may be readily and cheaply manufactured, and which is convenient for handling, particularly in assembling and disassembling.

Other objects and aims of the invention, more or less broad than those stated above, together with the advantages inherent, will be in part obvious and in part specifically referred to in the course of the following description of the elements, combinations, arrangements of parts, and applications of principles constituting the invention; and the scope of protection contemplated will appear from the claims.

In the accompanying drawings, which are to be taken as part of this specification, and in which we have shown merely a preferred form of embodiment of invention;

Figure 1 is a perspective view of an article embodying our invention;

Figure 2 is a side elevation, with parts broken away and in section, showing a plurality of the articles illustrated in Figure 1, in stacked relation;

Figure 3 is an enlarged detail showing the edge portion of the article;

Figure 4 is a vertical sectional view taken on the line 4—4 of Figure 3;

Figure 5 is an edge view of the article shown in Figure 1;

Figure 6 is a plan view of the label-and-fastener blank; and

Figure 7 illustrates in perspective a clip such as may be used with or without the label-and-fastener for integrating the container and its contained food-stuff unit.

Referring to the numerals on the drawings, we have shown a unit of food-stuff, as for instance, a pie, indicated by the numeral 8. This article is received in a container part 9 of appropriate shape and depth and which is preferably provided with an edge flange 10. Preferably the pie or other food-stuff unit is made with a view to its inclusion with the container, and consequently the edge portion at least of the pie projects above the edge of container part 9. A complementary container part is shown at 11, and this part 11 is similar to part 9, except that ordinarily it need not be so deep as part 9. Container part 11 therefore preferably has an edge flange 12, which cooperates with flange 10 in holding the container parts together, as hereinafter described; though it will be obvious that the container parts may be provided with cooperating portions other than flanges 10 and 12 for the same purpose. It will be observed that the container parts as shown have the general form of pie plates, the lower end 9, receiving the pie and constituting the bottom and body of the container, and the upper one 11, being turned upside down to serve as a cover for the container with its flange 12 coinciding with the flange of member 9. The side walls 14 of the upper container member 11 are preferably inclined downwardly and outwardly (assuming the parts to be in their packaging relation) so that when the container parts are closed about a pie the side walls 14 of the cover will engage and react with the edge crust portion of the pie. It follows that if the container parts are positively held together they will hold the contained pie substantially rigid. Furthermore, the structure of the container is particularly advantageous when the container parts are made of wood-pulp, card-board or fiber, because there is present an arch-truss (and where both container parts have inclined side walls—a double arch-truss). Thus the container parts, while they must have a relatively permanent set, need possess only a minimum of inherent strength and rigidity to enable the container to resist compression, as when a plurality of containers are stacked. The necessity for securing together the edge portions of the container parts, in order to prevent compression of the arches, will be apparent, and as an example of provision for such fastening we have shown the cooperating flanges 10 and 12, and clips 15 engaging them and extending over their edges. In connection with clips 15 we may employ a label-and-fastener member of paper shown in Figure 6, and comprising a circular body portion 16 of shape and size to overlie the cover part 11, and having radial tab extensions 17 which are adapted to pass over the meeting edges of flanges 10 and 12, and to pass partially under the container part 9, and held in position as by means of clips 15. In practice, the under surface of the circular part 16 may be provided with adhesive, so that it may adhere to the top surface of the upper container member, and in like manner the strips 17 may be caused to adhere to the surfaces with which they come in contact. The outer surfaces of the parts 16 and 17 may be usefully employed for advertising purposes. It will be appreciated that for fastening purposes the clips 15 might be used without the label-and-fastener member of Figure 6, or the latter might be used without the clips. And other fastening means might be used, or the container parts might have interengaging edge portions which would hold the container in assembled relation about the contained food-product unit.

Inasmuch as it is contemplated that the container parts are to be made of wood-pulp, card-board, or the like inexpensive material, so that they will have the minimum rigidity consistent with the functions they are to perform, it is found that the flanges 10 and 12 tend to separate or gap slightly between the points where they are held together by the clips 15 or tabs 17. These gaps are indicated (and exaggerated) in Figure 5. Through these openings dust etc. might pass, and drying out and deterioration of the contents take place. To guard against these results, we prefer to provide a wrapper 18 for the food-product unit, of waxed paper or the like, which partially or wholly encloses the food-product, at least to the extent that it is shielded against direct access through the gaps aforesaid.

As already suggested, the container parts will have sufficient inherent rigidity so that, when assembled and by reason of their structures and of their mechanical relations to the contained food-product unit and to each other, the resulting article-packages will be self-sustaining against collapse when stacked, resistant to shocks of handling etc.

Where the sealing tabs 17 are used, the unbroken condition of the seals will indicate the condition of the package contents, and if desired, in order to discourage refilling, fastening means could be employed which could be released only upon destruction of the container.

Inasmuch as many changes could be made in the above construction, and many apparently widely different embodiments of our invention could be made without departing from the scope thereof, it is intended that all matter contained in the above description or shown in the accompanying drawings shall be interpreted as illustrative and not in a limiting sense.

It is also to be understood that the language used in the following claims is intended to cover all the generic and specific features of the invention herein described and all statements of the scope of the invention which, as a matter of language, might be said to fall therebetween.

We claim:

1. A non-collapsible and self-sustaining packaged food product comprising a pie or the like, unitary article, a container portion surrounding the sides of the pie, another container portion contacting with the top edge portions of the pie, both container portions being relatively stiff, and means for holding the container portions together and in reactive relation with the pie.

2. The combination set forth in claim 1, in which the holding means is applied to the container portions on the outside thereof.

3. The combination set forth in claim 1, in which the container portions have the form respectively of flanged pie plates, one set upside down upon the other with their flanges coinciding.

4. The combination set forth in claim 1, in which the container portions have the form respectively of flanged pie plates with outwardly and upwardly inclined side walls, one set upside down upon the other with their flanges coinciding; and in which the side wall of the upper container portion rests upon the top edge portion of the pie.

5. The combination set forth in claim 1, in which the pie is provided with a wrapper.

6. The combination set forth in claim 1, in which the container portions are made of wood-pulp or the like material, and in which each includes an arch element that reacts with the arch element of the other and with the contained pie.

7. A container for edible articles comprising a circular dished member adapted to receive the article, a second like member adapted to rest upon the first member to enclose the article and a circular seal adhesively attached to one member and having sealing strips adapted to engage the other member.

In testimony whereof we affix our signatures.

F. DUVAL BROUN.
WILLIAM RUSSELL McALEVEY.